United States Patent [19]

Jackson

[11] Patent Number: 4,694,936

[45] Date of Patent: Sep. 22, 1987

[54] EXTERIOR BRAKE FOR TANDEM TIRES

[76] Inventor: Carl E. Jackson, 1019 6th St., Perry, Okla. 73077

[21] Appl. No.: 834,575

[22] Filed: Feb. 28, 1986

[51] Int. Cl.⁴ .............................................. B60T 1/04
[52] U.S. Cl. ................................... 188/2 R; 188/74; 70/226
[58] Field of Search ............... 188/2 R, 29, 32, 52, 188/53, 54, 55, 68, 74, 265, 73.1, 196 V; D12/217; 410/30; 70/225, 226, 228, 211, 212

[56] References Cited

U.S. PATENT DOCUMENTS

| | | | |
|---|---|---|---|
| 433,413 | 7/1890 | Lawrence | 188/54 |
| 472,997 | 4/1892 | Hayward | 188/32 |
| 770,510 | 9/1904 | Stullken | 188/32 |
| 1,223,247 | 4/1917 | Bolopue | 188/32 |
| 2,161,509 | 6/1939 | Farber | 70/212 X |
| 2,732,035 | 1/1956 | Besoyan | 188/4 R |
| 2,772,596 | 12/1956 | Trussell | 188/196 V X |
| 2,773,564 | 12/1956 | Garard, Sr. | 188/32 |
| 2,858,906 | 11/1958 | Minick | 188/32 |
| 2,954,101 | 9/1960 | Corson | 188/32 |
| 3,318,419 | 5/1967 | Chastain | 188/32 |
| 3,338,338 | 8/1967 | Lindeen | 188/32 |
| 3,537,548 | 11/1970 | Jeppesen | 188/32 |
| 3,547,228 | 12/1970 | Wiley | 188/32 |
| 3,548,975 | 12/1970 | Herndon | 188/74 |
| 3,695,071 | 10/1972 | West | 188/32 |
| 3,712,424 | 1/1973 | Swan | 188/74 |
| 3,907,072 | 9/1975 | Shafer | 188/32 |
| 4,031,726 | 6/1977 | De Jager | 188/32 X |
| 4,148,378 | 4/1979 | Alford | 188/74 |

Primary Examiner—Duane A. Reger
Attorney, Agent, or Firm—Laney, Dougherty, Hessin & Beavers

[57] ABSTRACT

An exterior brake for tandem tires having upper and lower wedges joined by a bar threaded to the wedges. The bar is rotated to move the wedges together and apart and is locked against rotation by a padlock extending through a lock tab on the bar. The upper and lower wedges fit in wedging engagement between the upper and lower tread surfaces, respectively, of tandem tires. Tire retaining flanges and a tamper prevention skirt are provided on the wedges. Expansion pads to adapt the wedges to tires spaced further apart are also provided.

20 Claims, 2 Drawing Figures

EXTERIOR BRAKE FOR TANDEM TIRES

BACKGROUND OF THE INVENTION

1. Field of the Invention

The present invention relates in general to exterior brakes for tires and more particularly to exterior brakes for tandem tires or tires which are radially closely spaced to each other on a vehicle.

2. Description of the Prior Art

Recreational vehicles, trailers and larger vehicles often have tandem axles and tires wherein tires on each side of the vehicle are closely radially spaced from each other. Usually these tires are from two to twelve inches apart at the closest portion of the treads of each. It is often desired to park such a vehicle having tandem tires for an extended period of time. During this parking it is desirable to brake or block the tires against movement, not only for safety against the vehicle rolling, but also for the purpose of securing the vehicle against theft.

There are a wide variety of blocking devices which can be placed in between the ground and tires to prevent rolling of the tires. Some of these devices can be locked to the wheel. Generally, however, a disadvantage of these devices is that they are difficult to use on muddy ground and they only can be used on one tire at a time.

Another type of device is a tandem wheel lock shown in U.S. Pat. No. 3,548,975. This device uses opposing wedges which extend between the upper and lower spaces between the tandem tires. A pair of lever links join the lower side of the upper wedge to the upper side of the lower wedge to draw the two wedges together as the leveraged linkage is moved to a locked position. A significant disadvantage of this device is that the leveraged linkage is difficult to adjust to provide a proper amount of tension so as to securely lock the wheels. The lever arm extends horizontally out from the wheels when the lever is open and such extension is not possible on vehicles with skirts over the tops of the wheels. Further, the linkage in the lever tends to pivot the wedges as the lever arms are moved to a locked position and this makes fastening the device to the tandem tires difficult. Still further, because these linkage arms pull the wedges together, the linkage which fits between the tires is necessarily large and may not fit between closely spaced tires. Finally, the wedges are not fixed to the tires so that if a sufficient force were applied they could be axially removed even when the lever arm is locked.

It is accordingly an object of the present invention to provide an improved exterior brake device for tandem wheels which is more secure and more easily fixed to the tandem wheels.

It is also an object of the present invention to provide an improved external brake for tandem tires which has a simpler construction and is more versatile than previous brakes.

SUMMARY OF THE INVENTION

In accordance with the above objects, the present invention provides an exterior brake device for braking tires against movement on a vehicle having a pair of tires which are radially closely spaced to each other. The brake comprises upper and lower opposing wedges which are sized for wedging engagement with the upper and lower, respectively, tread surfaces of a pair of radially closely spaced tires to prevent rotation of the tires. A threaded bar joins the upper and lower wedges and is threadedly connected thereto so that rotation of the bar moves the wedges toward and away from each other. A handle on the bar allows manual rotation of the bar. Thus, to apply the external brake to tandem tires, the wedges are positioned on the upper and lower portions of the facing tread surfaces of the tires and the handle is rotated to cause the wedges to move together until the wedges are pinched between the adjacent tires. So pinched, the tires cannot rotate.

Preferably a lock is provided which includes a lock tab fixedly connected to the bar and rotating therewith and having a padlock receiving hole therein which mates with a padlock receiving hole in one of the upper or lower wedges. A padlock adapted for fitting in the padlock receiving holes can then be inserted and locked to prevent rotating the bar and disengaging the wedges from the tires.

The device also preferably includes a means, such as a spring, for urging the wedges apart and assisting removal of the wedges as the bar is rotated to remove the wedges from the brake position. Inner and outer flanges on the wedges are provided for enclosing an engaged tire tread to prevent removal of the wedges in an axial direction with respect to the tires when the flanges enclose the engaged tire tread. The threaded engagement of the bar to the wedges preferably is on the outsides of the opposing wedges so that the wedges are pushed together from above and below as opposed to being pulled together. A skirt can be extended between the wedges to prevent access to the bar when the wedges are locked in a braking position. This will help prevent a thief from removing the brake by cutting the bar. Expansion pads can be removably connected to the upper and lower wedges to change the size of the wedges to fit different tire configurations.

For a further understanding of the invention and further objects, features and advantages thereof, reference may now be had to the following description taken in conjunction with the accompanying drawings.

DESCRIPTION OF PREFERRED EMBODIMENTS

Figure 1:
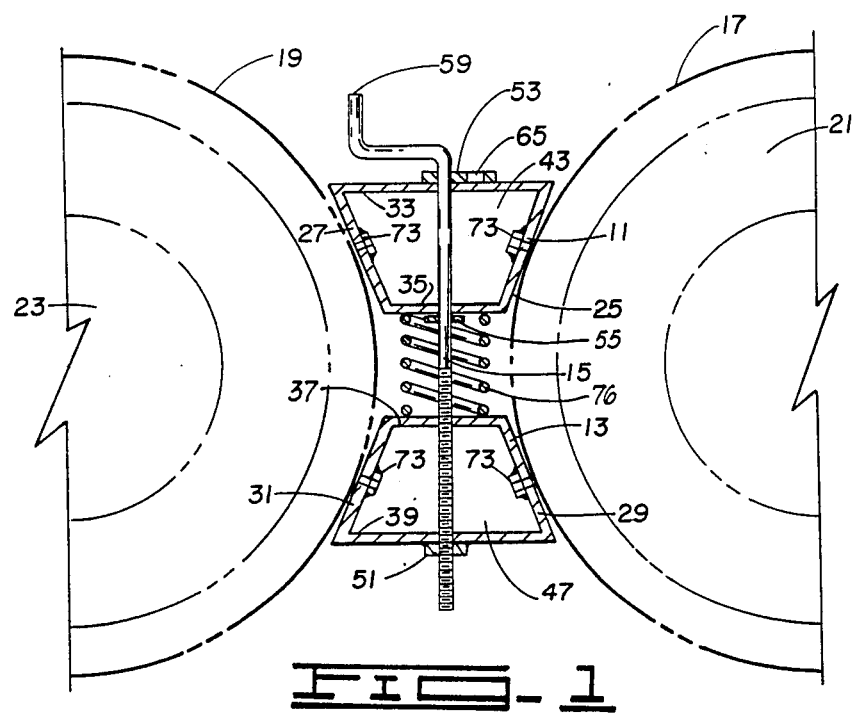
FIG. 1 is a cross-sectional view taken along a vertical center line of the device of the present invention shown installed on a pair of tandem tires.
Figure 2:
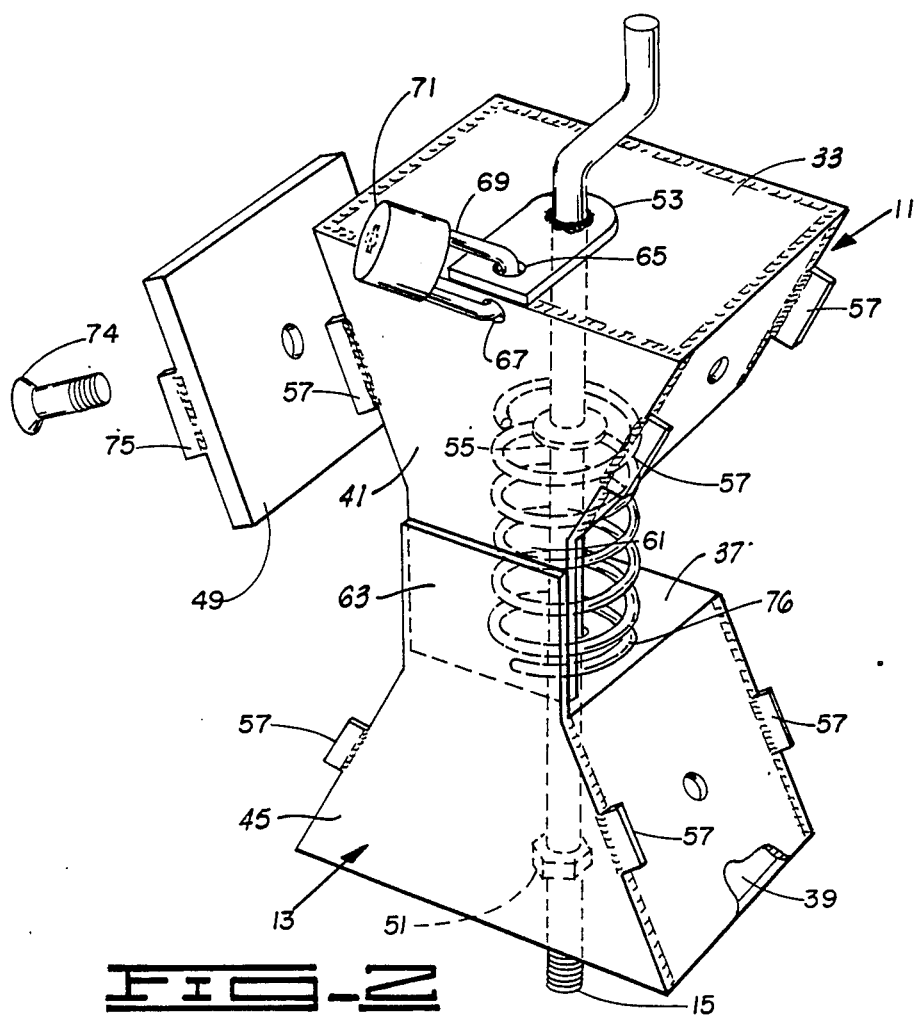
FIG. 2 is a perspective view of the device shown in FIG. 1.

Referring now to FIGS. 1 and 2, an exterior brake for tandem tires constructed in accordance with the present invention is shown. The device includes an upper wedge 11 and a lower wedge 13 connected by a threaded bar 15. As shown in FIG. 1, the wedges 11 and 13 are adapted for engaging the tread surfaces 17 and 19 of tandem tires 21 and 23, respectively. The upper wedge 11 spans across between the upper tread surfaces of tires 21 and 23 while the lower wedge 13 spans across the lower tread surfaces of the tires 21 and 23. The tires are radially closely spaced to each other as would occur on a recreation vehicle or the like with tandem axles.

Each of the wedges has a trapezoidal shape with opposing tread engaging surfaces regularly converging toward the center of the device. Wedge 11 has tread-engaging panels 25 and 27 and wedge 13 has tread-engaging panels 29 and 31. Each of the wedges also has upper and lower panels. Wedge 11 has upper panel 33 and lower panel 35 and wedge 13 has upper panel 37 and lower panel 39.

Each of the wedges 11 and 13 further includes front and rear side panels which enclose the wedges. Wedge 11 has a front panel 41 and a rear panel 43 and wedge 13 has a front panel 45 and a rear panel 47.

Generally tandem tires such as tires 21 and 23 are radially spaced from each other approximately two to twelve inches at their closest tread surfaces. Accordingly the wedges 11 and 13 are sized so that they can engage tires with this spacing. The upper panel 33 of wedge 11 and the lower panel 39 of wedge 13 have a width of approximately six inches whereas the lower panel 35 of wedge 11 and the upper panel 37 of wedge 13 have a width of approximately three inches. This allows the wedges to fit tires of different diameters and radial spacing as will be most commonly encountered on trailers and recreational vehicles. Expansion pads 49, described in more detail below, are provided for allowing the wedges 11 and 13 to fit even wider, larger radial spacings of tires. Thus, the wedges 11 and 13 are able to adapt to many different tire configurations.

The wedges 11 and 13 are adapted for wedging engagement with tandem tires 21 and 23. To move the wedges 11 and 13 toward and away from each other so as to be held in a wedging, braking position or be removed therefrom, the threaded bar 15 is provided and extends through the vertical center of wedges 11 and 13. The bar 15 is threaded through a nut 51 welded to the lower panel 39 of wedge 13. Thus, rotation of the bar 15 moves the wedge longitudinally along the bar 15. Welded to the upper end of bar 15 above the upper panel 33 is a retainer and lock tab 53. This retainer and lock tab 53 bears against the upper panel 33 of wedge 11 to prevent the wedge 11 from moving longitudinally upwardly along the bar 15 past the retainer and lock tab 53. Welded to the midportion of the bar immediately below the lower panel 35 of wedge 11 is a washer 55. The washer 55 bears against and retains the wedge 11 as the bar 15 is rotated. In this manner, as the bar 15 is rotated to cause the wedge 13 to move longitudinally with respect to bar 15 the wedge 11 is held by tab 53 and washer 55 from moving up or down the bar 15. 13.

The bar 15 has an angled handle 59 extending from the upper end thereof. The handle 59 allows the bar 15 to be manually rotated in moving the wedges together and apart in braking and releasing tandem tires 21 and 23.

Referring to FIG. 2, it can be seen that the front and rear panels of the wedges have extending retainer flanges 57. The flanges 57 extend adjacent to the tread engaging panels of the wedges 11 and 13 so that when the wedges 11 and 13 are in a braking position, the tread surfaces are enclosed by the flanges 57 to prevent an axial movement of the wedges 11 and 13 with respect to the tires. In other words, once the wedges 11 and 13 are locked into postion in wedging engagement with tires 21 and 23, the flanges 57 prevent the wedges from being removed from the tires by pulling or pushing on the wedges.

The front panels 41 and 45 of wedges 11 and 13 have protective skirts to prevent access to the bar 15 when the brake device is installed on a pair of tandem tires. Skirt 61 extends downwardly from panel 41 of wedge 11 and skirt 63 extends upwardly from panel 45 of wedge 13. The skirts 61 and 63 overlap so that access to the space between the wedges 11 and 13 from the outside of the tires 21 and 23 is prevented. This will prevent a thief from cutting the bar 15 to remove the wedges 11 and 13 and release the exterior brake.

The retainer and locking tab 53 is provided with a padlock receiving hole 65 which mates with a padlock receiving hole 67 which extends through the upper panel 33 and side panel 41 of wedge 11. When the padlock receiving holes 65 and 67 are aligned, the shackle 69 of a padlock 71 can be passed therethrough and secured. Since the locking tab 63 is welded to bar 15 and rotates therewith, the locking of the tab 53 prevents the bar 15 from being rotated. Once the lock 71 is in place, therefore, the wedges 11 and 13 cannot be moved without first removing the padlock 71.

To allow the wedges 11 and 13 to adapt to larger tandem tire configurations, expansion pads 49 are provided. The expansion pads 49 fit between the retaining flanges 57 and are attached to the tread-engaging panels by bolts 74 which extend through the center of expansion pads 49 and tread-engaging panels into nuts 73 to the interior of the panels. The heads of bolts 74 fit into recesses in the pads 49 and are covered by the tire treads when in use. The pads 49 are approximately the same size as the tire-engaging surfaces of the wedges 11 and 13 and have retainer flanges 75. Although for example, only one retainer pad 49 is shown in FIG. 2, four retainer pads are provided for each of the tire-engaging surfaces 25, 27 and 31.

The expansion pads 49 have approximately a one inch width so that the wedges 11 and 13 are extended approximately to two inches by the addition of the pads. If desired, pads of even larger widths can be provided to further expand the wedges 11 and 13. The larger pads will, of course, use longer bolts 74.

In use for braking a vehicle with tandem tires, the wedges 11 and 13 are first moved apart by rotating the handle 59 until the wedges 11 and 13 can be positioned between tandem tires 21 and 23. The handle 59 is then rotated until the wedges 11 and 13 snugly wedge between the tread surfaces of tires 21 and 23. The handle 59 is then further rotated until the padlock receiving holes 65 and 67 are aligned. The padlock 71 is then attached so that the wedges 11 and 13 are locked in a braking position. It can be seen that the rotation of the bar 15 allows the wedges 11 and 13 to be moved linearly to a widely varying range of wedge positions. Moreover, since the nut 51 and tab 53 are located on the outsides of wedges 11 and 13, the wedges are pushed together as opposed to being pulled together. This importantly extends the range of travel permitted by the wedges 11 and 13 and provides a more positive wedging action between the wedges 11 and 13.

To remove the braking device, the lock 71 is removed from the locking tab 53 and the handle 59 is rotated to move the wedges 11 and 13 apart. The washer 55 urges the wedges apart and assists separating the wedges from their wedged engagement with the tires 21 and 23. It also allows the wedges to continue to move apart until the tabs 57 clear the tires 21 and 23. Once the tabs 57 clear the tires 21 and 23, the braking device can be removed. Other means, such as spring 76 between wedges 11 and 13, may be used for urging the wedges apart and assisting removal of the wedges as bar 15 is rotated.

Although the braking device is shown only with front skirts 61 and 63, rear skirts can also be provided if access from between the tandem tires to the bar 15 is a concern. These rear skirts extend downwardly and upwardly, respectively, from the rear panels 43 and 47.

The rear skirts would completely enclose the bar 15 to prevent access from either side of the bar 15.

Construction of the braking device of the present invention can be achieved utilizing sheet metal stock cut and welded to form the wedges 11 and 13. Bar stock can be bent and threaded to form the bar 15. The nut 51 and the retainer tab 53 can be welded to the respective panels 39 and bar 15. Thus, construction of the present invention is relatively simple.

If desired, the tread-engaging surfaces 25, 27, 29 and 31 can be provided with roughened surface to better prevent rotation of the tires 21 and 23 when the braking device is wedged in a braking position. This roughening can be provided by grit containing epoxy paint or the like.

As can be seen by the above description, the exterior braking device of the present invention is well adapted to achieve the objects and advantages mentioned as well as those inherent therein. Presently preferred embodiments of the present invention have been described for the purpose of this disclosure, numerous changes in the construction and arrangement of parts can be made by those skilled in the art, which changes are encompassed within the spirit of this invention as defined by the appended claims.

The foregoing disclosure and showings made of the drawings are merely illustrative of the principles of this invention and are not to be interpreted in a limiting sense.

What is claimed is:

1. An exterior brake device for braking tires against movement on a vehicle having a pair of tires which are radially closely spaced, said brake device comprising:
   upper and lower opposing wedges which are sized for wedging engagement with upper and lower, respectively, tread surfaces of said spaced tires for preventing rotation of the tires;
   a threaded bar joining said upper and lower wedges and connected thereto so that rotation of the bar moves the wedges toward and away from each other;
   handle means connected to said bar for rotating said bar for moving said wedges toward and away from each other;
   lock means for locking said bar against rotation; and
   expansion pads adapted to be removably connected to said upper and lower wedges for changing the size of said wedges to fit different tire configurations and for engaging tread surfaces of said different tire configurations.

2. The device of claim 1 wherein each of said expansion pads are connected to said wedges by a bolt extending through the corresponding pad such that the bolt is covered by a tire tread when said pads are engaged with said tread surfaces.

3. The device of claim 1 wherein each of said wedges and said pads includes at least one flange extending therefrom for engagement with a tread on one of said tires for preventing removal of said wedges in an axial direction with respect to said tires.

4. The device of claim 1 wherein each of said expansion pad includes a flange extending therefrom for engaging a tread of one of said tires for preventing removal of said wedges and expansion pads attached thereto in an axial direction with respect to said tires.

5. The device of claim 1 further comprising a spring disposed around said bar between said wedges for biasing said wedges apart for assisting in removing said wedges from wedging engagement with said tread surfaces.

6. The device of claim 1 further comprising a skirt extending between said wedges for preventing access to a space between said wedges from outside of said tires and thereby preventing tampering with a portion of said bar which extends between said wedges.

7. An exterior brake device for braking tires against movement of a vehicle having a pair of tires which are radially closely spaced, said brake device comprising:
   upper and lower wedges which are sized for wedging engagement with upper and lower, respectively, tread surfaces of said spaced tires for preventing rotation of the tires, one of said wedges having adjacent panels defining a padlock receiving hole therethrough;
   a threaded bar joining said upper and lower wedges and connected thereto so that rotation of the bar moves the wedges toward and away from each other, said bar having a lock tab fixedly connected thereto and rotatable therewith, said lock tab defining a padlock receiving hole therein alignable with a portion of the padlock receiving hole in said one wedge;
   handle means connected to said bar for rotating said bar for moving said wedges toward and away from each other; and
   a padlock adapted for locking engagement with said padlock receiving holes.

8. The device of claim 7 wherein one of said upper and lower wedges is threaded to said bar and the other of said wedges is longitudinally retained with respect to said bar by retaining means fixed to said bar.

9. The device of claim 8 wherein each of said wedges includes inner and outer flanges for enclosing an engaged tire tread to prevent removal of the wedges in an axial direction with respect to said tires when flanges enclose and engage said tire tread.

10. The device of claim 7 further comprising a spring disposed around said bar between said wedges for biasing said wedges apart for assisting in removing said wedges from wedging engagement with said surfaces.

11. The device of claim 7 further comprising a skirt extending between said wedges for preventing access to a space between said wedges from outside of said tires and thereby preventing tampering with a portion of said bar which extends between said wedges.

12. An exterior brake device for braking tires against movement on a vehicle having a pair of tires which are radially closely spaced, said brake device comprising:
   upper and lower opposing wedges which are sized for wedging engagement with upper and lower, respectively, tread surfaces of said spaced tires for preventing rotation of the tires, each of said upper and lower wedges having upper and lower sides, said lower wedge further including a nut fixed to said lower side thereof;
   a threaded bar threadingly engaged with said nut and joining said upper and lower wedges and connected thereto so that rotation of the bar moves the wedges toward and away from each other, said bar having a retaining tab fixed thereto above said lower wedge and bearing against said upper side of said upper wedge so that said upper wedge is retained against upward movement with respect to said bar; and handle means connected to said bar for rotating said bar for moving said wedges toward and away from each other.

13. The device of claim 12 wherein said retaining tab has a padlock receiving hole therein which mates with a padlock receiving hole in said upper wedge and which further comprises:
a padlock adapted for locking engagement with said padlock receiving holes.

14. The device of claim 13 which further includes a spring extending around said bar between said upper side of said lower wedge and said lower side of said upper wedge urging said wedges apart so as to assist in removing said wedges from wedging engagement with the treads of tires.

15. An exterior brake device for braking tires against movement on a vehicle having a pair of tires which are radially closely spaced, said brake device comprising:
upper and lower opposing wedges which are sized for wedging engagement with upper and lower, respectively, tread surfaces of said spaced tires when in an operating position for preventing rotation of the tires;
a bar having a threaded portion joining said upper and lower wedges and connected thereto so that rotation of the bar moves the wedges toward and away from each other;
handle means connected to said bar for rotating said bar to move said wedges toward and away from each other; and
skirt means extending between said wedges when in said operating position for preventing access to a space between said wedges from outside of said tires and thereby preventing tampering with any portion of said bar which extends between said wedges regardless of the relative distance between said wedges.

16. The device of claim 15 further comprising lock means for locking said bar against rotation.

17. The device of claim 15 further comprising expansion pads adapted to be removably connected to said upper and lower wedges for changing the size of said wedge for fitting different tire configurations.

18. The device of claim 15 further comprising a spring disposed around said bar between said wedges for biasing said wedges apart for assisting in removing said wedges from wedging engagement with said tread surfaces.

19. The device of claim 15 wherein said skirt means is characterized by a skirt extending from each of said wedges toward the other of said wedges, said skirts overlapping when said wedges are in said operating position.

20. An exterior brake device for braking tires against movement on a vehicle having a pair of tires which are radially closely spaced, said brake device comprising:
upper and lower opposing wedges which are sized for wedging engagement with upper and lower, respectively, tread surfaces of said spaced tires for preventing rotation of the tires;
a threaded bar joining said upper and lower wedges and connected thereto so that rotation of the bar moves the wedges toward and away from each other;
handle means connected to said bar for rotating said bar to move said wedges toward and away from each other; and
a pair of skirts extending between said wedges for preventing access to a space between said wedges from outside of said tires and thereby preventing tampering with a portion of said bar which extends between said wedges, one of said skirts extending downwardly from said upper wedge, and the other of said skirts extending upwardly from said lower wedge, such that said skirts are continuously overlapped, regardless of the relative position of said wedges.

* * * * *